(12) United States Patent
Park et al.

(10) Patent No.: US 11,330,273 B2
(45) Date of Patent: *May 10, 2022

(54) IN-LOOP FILTERING METHOD AND APPARATUS FOR SAME

(71) Applicant: LG Electronics Inc., Seoul (KR)

(72) Inventors: Seung Wook Park, Seoul (KR); Jae Hyun Lim, Seoul (KR); Jung Sun Kim, Seoul (KR); Joon Young Park, Seoul (KR); Young Hee Choi, Seoul (KR); Byeong Moon Jeon, Seoul (KR); Yong Joon Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/110,110

(22) Filed: Dec. 2, 2020

(65) Prior Publication Data
US 2021/0092402 A1 Mar. 25, 2021

Related U.S. Application Data

(63) Continuation of application No. 16/572,294, filed on Sep. 16, 2019, now Pat. No. 10,887,603, which is a
(Continued)

(51) Int. Cl.
*H04N 19/157* (2014.01)
*H04N 19/117* (2014.01)
(Continued)

(52) U.S. Cl.
CPC ......... *H04N 19/157* (2014.11); *H04N 19/117* (2014.11); *H04N 19/176* (2014.11);
(Continued)

(58) Field of Classification Search
CPC .... H04N 19/157; H04N 19/80; H04N 19/176; H04N 19/61; H04N 19/117; H04N 19/182; H04N 19/82
See application file for complete search history.

(56) References Cited

U.S. PATENT DOCUMENTS 7,796,690 B2 9/2010 Yagasaki et al.
8,160,135 B2 4/2012 Yagasaki et al.
(Continued)

FOREIGN PATENT DOCUMENTS

CN 1255018 5/2000
CN 1480026 3/2004
(Continued)

OTHER PUBLICATIONS

CN Office Action in Chinese Appln. No. 2017-10367074.2, dated Aug. 19, 2019, 15 pages, (with English Translation).
(Continued)

*Primary Examiner* — Robert J Hance
(74) *Attorney, Agent, or Firm* — Fish & Richardson P.C.

(57) ABSTRACT

According to the present invention, an image-encoding method comprises the following steps: receiving image information; generating a restored block for the current block based on the image information; and generating a finally restored block for the current block by applying an in-loop filter to the restored block on the basis of the image information. According to the present invention, image-encoding/decoding efficiency may be improved.

8 Claims, 12 Drawing Sheets

Related U.S. Application Data continuation of application No. 14/007,979, filed as application No. PCT/KR2012/002345 on Mar. 30, 2012, now Pat. No. 10,419,764.

(60) Provisional application No. 61/470,500, filed on Apr. 1, 2011, provisional application No. 61/469,786, filed on Mar. 30, 2011.

(51) Int. Cl.
| | | |
|---|---|---|
| *H04N 19/82* | (2014.01) | |
| *H04N 19/80* | (2014.01) | |
| *H04N 19/176* | (2014.01) | |
| *H04N 19/61* | (2014.01) | |
| *H04N 19/182* | (2014.01) | |

(52) U.S. Cl.
CPC ........... *H04N 19/182* (2014.11); *H04N 19/61* (2014.11); *H04N 19/80* (2014.11); *H04N 19/82* (2014.11)

(56) References Cited

U.S. PATENT DOCUMENTS

| | | | |
|---|---|---|---|
| 8,170,100 B2 | 5/2012 | Yagasaki et al. | |
| 8,189,658 B2 | 5/2012 | Yagasaki et al. | |
| 8,204,129 B2 | 6/2012 | He | |
| 2004/0190626 A1* | 9/2004 | Sun | H04N 19/15 375/240.18 |
| 2005/0123057 A1 | 6/2005 | MacInnis et al. | |
| 2005/0249289 A1 | 11/2005 | Yagasaki et al. | |
| 2007/0160129 A1 | 7/2007 | Fujisawa et al. | |
| 2008/0240252 A1 | 10/2008 | He | |
| 2010/0329330 A1 | 12/2010 | Yagasaki et al. | |
| 2010/0329331 A1 | 12/2010 | Yagasaki et al. | |
| 2010/0329351 A1 | 12/2010 | Yagasaki et al. | |
| 2011/0007818 A1 | 1/2011 | Yagasaki et al. | |
| 2011/0032990 A1 | 2/2011 | Choi et al. | |
| 2011/0044387 A1 | 2/2011 | Yagasaki et al. | |
| 2011/0216822 A1 | 9/2011 | Yagasaki et al. | |
| 2011/0216823 A1 | 9/2011 | Yagasaki et al. | |
| 2011/0216824 A1 | 9/2011 | Yagasaki et al. | |
| 2011/0216825 A1 | 9/2011 | Yagasaki et al. | |
| 2011/0222599 A1 | 9/2011 | Yagasaki et al. | |
| 2011/0222607 A1* | 9/2011 | An | H04N 19/102 375/240.24 |
| 2011/0274158 A1* | 11/2011 | Fu | H04N 19/439 375/240.02 |
| 2011/0305274 A1* | 12/2011 | Fu | H04N 19/107 375/240.02 |
| 2012/0170649 A1* | 7/2012 | Chen | H04N 19/60 375/240.12 |
| 2012/0177116 A1* | 7/2012 | Panusopone | H04N 19/122 375/240.12 |
| 2012/0189059 A1* | 7/2012 | Segall | H04N 19/513 375/240.16 |
| 2012/0213274 A1* | 8/2012 | Lim | H04N 19/593 375/240.12 |

FOREIGN PATENT DOCUMENTS

| | | | |
|---|---|---|---|
| CN | 101044762 | 9/2007 | |
| CN | 101106718 | 1/2008 | |
| CN | 101115201 | 1/2008 | |
| CN | 101179720 | 5/2008 | |
| CN | 101828400 | 9/2010 | |
| FR | 2660138 | 9/1991 | |
| JP | 2004135251 | 4/2004 | |
| JP | 2007184871 | 7/2007 | |
| KR | 20100014581 | 2/2010 | |
| KR | 20110014000 | 2/2011 | |
| WO | WO2004034330 | 4/2004 | |
| WO | WO2008118562 | 10/2008 | |
| WO | WO2011016678 | 2/2011 | |
| WO | WO-2012150849 A2 * | 11/2012 | ............ H04N 19/82 |

OTHER PUBLICATIONS

Keiichi Chono, Proposal of enhanced PCM coding in HEVC, JCTVC-E192, Joint Collaborative Team on Video Coding (JCT-VC) of ITU-T SG16 WP3 and ISO/IEC JTC1/SC29/WG11, 5$^{th}$ Meeting: Geneva, CH, Mar. 16-23, 2011, 14 pages.

Office Action issued in Chinese Application No. 201280016858.6 dated Feb. 19, 2016, 8 pages.

Chono et al., "Proposal of enhanced PCM coding in HEVC," 96. MPEG Meeting; Mar. 21, 2011-Mar. 25, 2011; Geneva; (Motion Picture Expert Group or ISO/IEC JTC1/SC29/WG11), No. m19710, Mar. 21, 2011 (Mar. 21, 2011), XP030048277, 12 pages.

Chono et al., "Pulse code modulation mode for HEVC," Mar. 10, 2011, No. JCTVC-E057, Mar. 10, 2011 (Mar. 10, 2011), XP030008563, 26 pages.

Joch, "UB Video Comments on the Draft Text," 6. JVT Meeting; 63. MPEG Meeting; Sep. 12, 2002-Dec. 13, 2002; Awaji, JP; (Joint Video Team of ISO/IEC JTC1/SC29/WG11 and ITU-T SG.16), No. JVT-F074-L, Dec. 13, 2002 (Dec. 13, 2002), XP030005642, 5 pages.

Partial Supplementary European Search Report issued in European Application No. 12763057.2 dated May 11, 2016, 9 pages.

Sullivan et al., "Meeting report of the fifth meeting of the Joint Collaborative Team on Video Coding (JCT-VC), Geneva, CH, Mar. 16-23, 2011," 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); No. JCTVC-E600, Mar. 21, 2011 (Mar. 21, 2011), XP030009012, 162 pages.

Sullivan et al., "Meeting report of the fifth meeting of the Joint Collaborative Team on Video Coding (JCT-VC), Geneva, CH, Mar. 16-23, 2011," JCTVC-E600v3, Joint Collaborative Team on Video Coding (JCT-VC) of ITU-T SG16 WP3 and ISO/IEC JT C1/SC29/WG11 5th Meeting: Geneva, CH, Mar. 16-23, 2011, 1 page.

International Search Report dated Oct. 30, 3012 for Application No. PCT/KR2012/002345, with English Translation, 6 pages.

* cited by examiner (a)

(b)

(c)

(d)

IN-LOOP FILTERING METHOD AND APPARATUS FOR SAME

CROSS REFERENCE TO RELATED APPLICATIONS

This application is a continuation of U.S. application Ser. No. 16/572,294, filed on Sep. 16, 2019, which is a continuation of U.S. application Ser. No. 14/007,979, filed on Sep. 27, 2013, now U.S. Pat. No. 10,419,764, which is a National Stage Application under 35 U.S.C. § 371 of International Application PCT/KR2012/002345, filed on Mar. 30, 2012, which claims the benefit of U.S. Provisional Application No. 61/469,786, filed on Mar. 30, 2011, and U.S. Provisional Application No. 61/470,500, filed on Apr. 1, 2011, the entire contents of which are hereby incorporated by reference.

TECHNICAL FIELD

The present invention relates to video processing, and more particularly, to an in-loop filtering method.

BACKGROUND ART

The need for videos having high resolution and high quality, such as high-definition (HD) and ultrahigh-definition (UHD) videos, has recently been increasing in various fields. As a video has higher resolution and higher quality, the amount of information or bits in the video data to be transferred increases as compared with existing video data. Accordingly, if video data is transferred using media, such as existing wired/wireless broadband lines, or video data is stored in existing storage media, costs for transfer and storage increase. In order to address such problems, high-efficiency video compression techniques can be utilized.

Various video compression techniques may be employed, for instance, inter prediction in which pixel values included in a current picture are predicted based on previous or subsequent pictures of the current picture, intra prediction in which pixel values included in a current picture are predicted using pixel information in the current picture, and an entropy encoding technique of allocating a short codeword to a symbol with a high frequency of appearance and allocating a long codeword to a symbol with a low frequency of appearance. Such video compression methods enable video data to be efficiently compressed for transfer and storage.

DISCLOSURE

Technical Problem

An aspect of the present invention provides a video encoding method and a video encoding apparatus which are capable of improving video encoding/decoding efficiency.

Another aspect of the present invention provides a video decoding method and a video decoding apparatus which are capable of improving video encoding/decoding efficiency.

Still another aspect of the present invention provides an in-loop filtering method and an in-loop filtering apparatus which are capable of improving video encoding/decoding efficiency.

Still another aspect of the present invention provides a deblocking filtering method and a deblocking filtering apparatus which are capable of improving video encoding/decoding efficiency.

Still another aspect of the present invention provides an SAO process and an apparatus for performing the same which are capable of improving video encoding/decoding efficiency.

Still another aspect of the present invention provides an adaptive loop filtering method and an adaptive loop filtering apparatus which are capable of improving video encoding/decoding efficiency.

Technical Solution (1) An embodiment of the present invention relates to a video decoding method. The method includes receiving video information, generating a reconstructed block of a current block based on the video information, and generating a final reconstructed block of the current clock by applying an in-loop filter to the reconstructed block based on the video information, wherein a final pixel value in the final reconstructed block is determined on whether an encoding mode for the current block is an intra pulse code modulation (I_PCM) mode.

(2) In (1), the in-loop filter may include a deblocking filter, the generating of the final reconstructed block may further include determining a boundary strength (bS) of a block edge located within or on a boundary of the reconstructed block, determining whether to apply the deblocking filter to the block edge based on the bS, and deriving the final pixel value based on whether to apply the deblocking filter, and the deriving of the final pixel value may determine a pixel value which is not subjected to deblocking filtering within the reconstructed block as the final pixel value when the encoding mode for the current block is the I_PCM mode.

(3) In (2), the determining of whether to apply the deblocking filter may determine not to apply the deblocking filter to the block edge when the encoding mode for the current block is the I_PCM mode.

(4) In (1), the in-loop filter may include a sample adaptive offset (SAO), and the generating of the final reconstructed block may not apply the SAO to a pixel within the reconstructed block when the encoding mode for the current block is the I_PCM mode.

(5) In (1), the in-loop filter may include an adaptive loop filter (ALF), the generating of the final reconstructed block may further include determining whether to apply the ALF to the reconstructed block, determining a filter shape and a filter coefficient of the ALF, and deriving the final pixel value based on the filter shape and the filter coefficient according to whether to apply the ALF, and the deriving the final pixel value may determine a pixel value which is not subjected to adaptive loop filtering within the reconstructed block as the final pixel value when the encoding mode for the current block is the I_PCM mode.

(6) In (5), the determining of whether to apply the ALF may determine not to apply the ALF to the reconstructed block when the encoding mode for the current block is the I_PCM mode.

(7) In (5), the video information may further include PCM flag information to instruct whether the encoding mode for the current block is the I_PCM mode, and the determining of whether to apply the ALF may determine whether to apply the ALF based on the PCM flag information.

(8) In (7), the video information may further include PCM loop filter flag information to instruct whether the in-look filter is applied to a block encoded in the I_PCM mode, and the determining of whether to apply the ALF may determine whether to apply the ALF based on the PCM flag information and the PCM loop filter flag information.

(9) In (7), the current block may be a coding unit (CU) to be decoded, the video information may further include ALF flag information to instruct whether adaptive loop filtering is performed on the current block, and the determining of whether to apply the ALF may determine whether to apply the ALF based on the PCM flag information and the ALF flag information.

(10) In (1), the in-loop filter may include at least one of a deblocking filter, an SAO and an ALF, and the generating of the final reconstructed block may perform clipping only on an output of the in-loop filter which is finally applied to the reconstructed block among the deblocking filter, the SAO and the ALF.

(11) Another embodiment of the present invention relates to a video encoding method. The method includes generating a reconstructed block of a current block, generating a final reconstructed block of the current clock by applying an in-loop filter to the reconstructed block, and transmitting video information about application of the in-loop filter, wherein a final pixel value in the final reconstructed block is determined on whether an encoding mode for the current block is an intra pulse code modulation (I_PCM) mode.

(12) In (11), the in-loop filter may include a deblocking filter, the generating of the final reconstructed block may further include determining a boundary strength (bS) of a block edge located within or on a boundary of the reconstructed block, determining whether to apply the deblocking filter to the block edge based on the bS, and deriving the final pixel value based on whether to apply the deblocking filter, and the deriving of the final pixel value may determine a pixel value which is not subjected to deblocking filtering within the reconstructed block as the final pixel value when the encoding mode for the current block is the I_PCM mode.

(13) In (11), the in-loop filter may include a sample adaptive offset (SAO), and the generating of the final reconstructed block may not apply the SAO to a pixel within the reconstructed block when the encoding mode for the current block is the I_PCM mode.

(14) In (11), the in-loop filter may include an adaptive loop filter (ALF), the generating of the final reconstructed block may further include determining whether to apply the ALF to the reconstructed block, determining a filter shape and a filter coefficient of the ALF, and deriving the final pixel value based on the filter shape and the filter coefficient according to whether to apply the ALF, and the deriving the final pixel value may determine a pixel value which is not subjected to adaptive loop filtering within the reconstructed block as the final pixel value when the encoding mode for the current block is the I_PCM mode.

(15) In (14), the determining of whether to apply the ALF may determine not to apply the ALF to the reconstructed block when the encoding mode for the current block is the I_PCM mode.

Advantageous Effects

According to a video encoding method in accordance with the present invention, video encoding/decoding efficiency may be enhanced.

According to a video decoding method in accordance with the present invention, video encoding/decoding efficiency may be enhanced.

According to an in-loop filtering method in accordance with the present invention, video encoding/decoding efficiency may be enhanced.

According to a deblocking filtering method in accordance with the present invention, video encoding/decoding efficiency may be enhanced.

According to an SAO process in accordance with the present invention, video encoding/decoding efficiency may be enhanced.

According to an adaptive loop filtering method in accordance with the present invention, video encoding/decoding efficiency may be enhanced.

MODE FOR INVENTION

Figure 1:
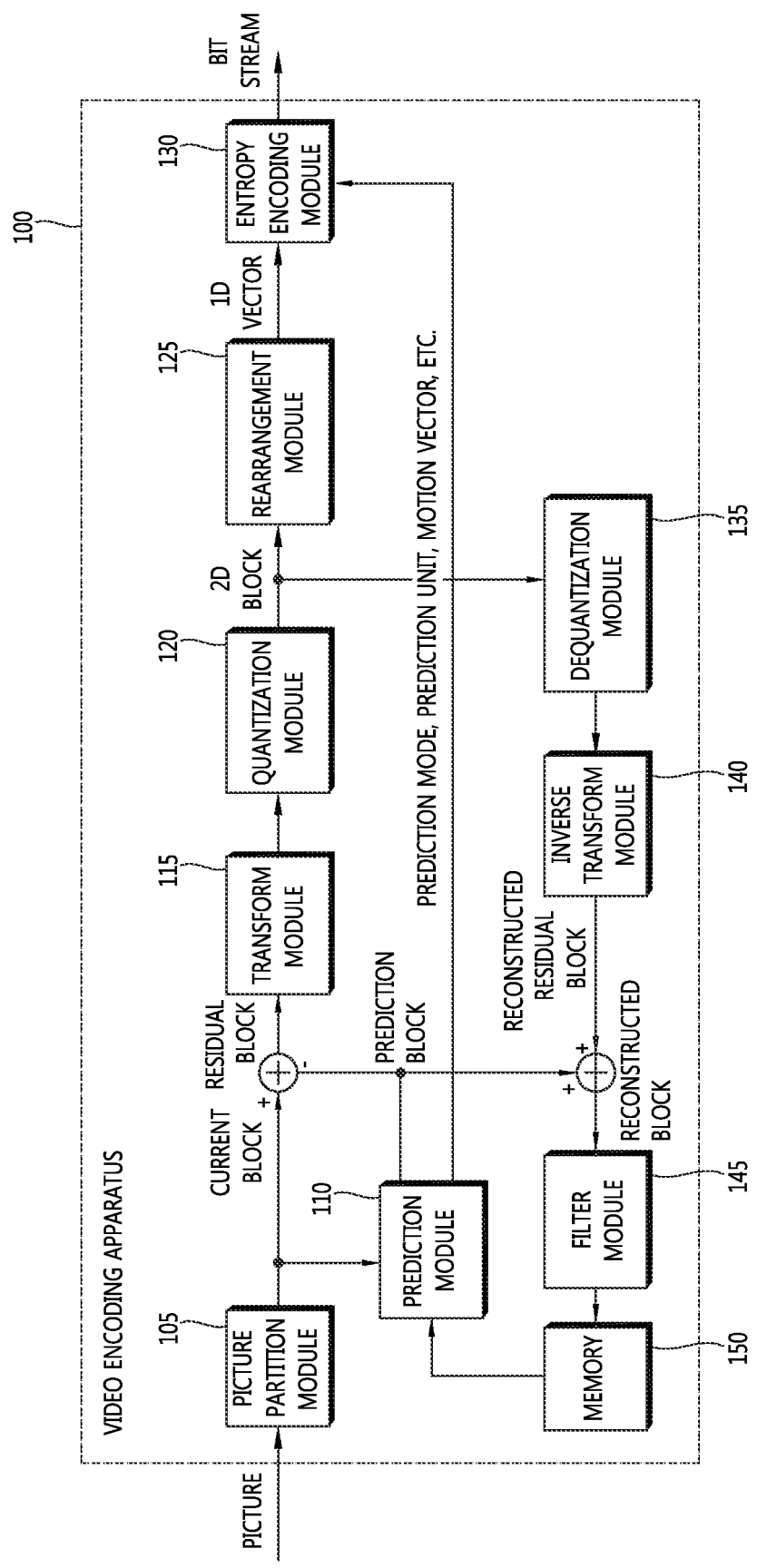
FIG. 1 is a block diagram schematically illustrating a video encoding apparatus according to an exemplary embodiment of the present invention.

The present invention may be modified in various ways, and the present invention may have several embodiments. Specific embodiments of the present invention are illustrated in the drawings and described in detail. However, the present invention is not limited only to the specific embodiments given. The terms used in this specification are used to describe only the specific embodiments and are not intended to restrict the technical scope of the present invention. An expression referencing a singular value additionally refers to a corresponding expression of the plural number, unless explicitly limited otherwise by the context. In this specification, terms such as "comprise" or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Meanwhile, elements in the drawings described in the present invention are independently illustrated for convenience of description regarding the different characteristics and functions of the encoder and decoder, but this does not indicate that each of the elements is implemented using separate hardware or separate software. For example, two or more of the elements may be combined to form one element, and one element may be divided into a plurality of elements. It is to be noted that embodiments in which some elements are integrated into one combined element and/or an element is separated into multiple separate elements are included in the scope of the present invention, given that they do not depart from the essence of the present invention.

Some constituents are not essential to the substantial functions in the invention and may be optional constituents for merely improving performance. The invention may be embodied to include only constituents essential to embodiment of the invention, except for the constituents used to merely improve performance. The structure including only the essential constituents except for the optical constituents used to merely improve performance belongs to the scope of the invention.

Hereinafter, some exemplary embodiments of the present invention are described in detail with reference to the accompanying drawings. Hereinafter, the same reference numerals will designate the same elements throughout the drawings, and redundant description of the same elements is omitted.

FIG. 1 is a block diagram schematically illustrating a video encoding apparatus according to an exemplary embodiment of the present invention. Referring to FIG. 1, the video encoding apparatus 100 includes a picture partition module 105, a prediction module 110, a transform module 115, a quantization module 120, a rearrangement module 125, an entropy encoding module 130, an dequantization module 135, an inverse transform module 140, a filter module 145, and memory 150.

The picture partition module 105 may partition an input picture into one or more processing units. The processing unit may be a prediction unit (hereinafter, referred to as a "PU"), a transform unit (hereinafter, referred to as a "TU"), or a coding unit (hereinafter, referred to as a "CU").

The CU may refer to an encoding/decoding unit of a picture. A single coding block in a picture to be encoded has a depth based on a quadtree structure and may be recursivly subdivided. Here, a coding block that cannot be split any more may be the CU, and a coder may code the CU. The CU may have different sizes, for example, 64×64, 32×32, 16×16, and 8×8. A single CU may be split into a plurality of PUs and/or a plurality of TUs. Hereinafter, a "unit" may be referred to as a "block."

The prediction module 110 may include an inter prediction module to perform inter prediction and an intra prediction module to perform intra prediction, which will be described later. The prediction module 110 may generate a prediction block by performing prediction on the processing unit of the picture derived by the picture partition module 105. The processing unit of the picture predicted from the prediction module 110 may be a CU, a TU, or a PU. Furthermore, the prediction module 110 may determine whether prediction performed on a corresponding processing unit is inter prediction or intra prediction and determine details (e.g., prediction mode) of each prediction method. Here, a processing unit on which prediction is performed may be different from a processing unit on which a prediction method and a detail thereof is determined. For example, a prediction method and a prediction mode may be determined on a PU, and prediction may be performed on a TU. A residual value (or a residual block) between the generated prediction block and an original block may be input to the transform module 115. Furthermore, information on a prediction mode and information on a motion vector used for the prediction, along with the residual value, may be coded in the entropy encoding module 130 and transferred to a decoder.

The transform module 115 generates a transform coefficient by performing transformation on the residual block in the TU. The transform unit transofrmed by the transform module 115 can be a TU, and the TU can have a quad tree structure. Here, the size of the TU can be determined within a range having maximum and minimum values. The transform module 115 may transform the residual block using discrete cosine transform (DCT) and/or discrete sine transform (DST).

The quantization module 120 may generate quantization coefficients by quantizing the residual values transformed by the transform module 115. The quantization coefficients generated by the quantization module 120 are provided to the dequantization module 135 and the rearrangement module 125.

The rearrangement module 125 may rearrange the quantization coefficients provided by the quantization module 120. By rearranging the quantization coefficients, coding efficiency in the entropy encoding module 130 can be improved. The rearrangement module 125 may rearrange the quantization coefficients in a two-dimensional block form into quantization coefficients in a one-dimensional vector form using a coefficient scanning method. The rearrangement module 125 may change the order of coefficient scanning based on the probability statistics of the quantization coefficients received from the quantization module 120, thereby improving entropy encoding efficiency in the entropy encoding module 130.

The entropy encoding module 130 may perform entropy encoding on the quantization coefficients rearranged by the rearrangement module 125. The entropy encoding module 130 may code various pieces of information, for example, information on the quantization coefficients and block type of a CU received from the rearrangement module 125 and the prediction module 110, information on prediction mode, information on a partition unit, information on a PU, information on a transmission unit, information on a motion vector, information on a reference picture, information on an interpolation of a block, and filtering information.

Coding methods, such as exponential Golomb, context-adaptive variable length coding (CAVLC), or context-adaptive binary arithmetic coding (CABAC), may be used in the entropy coding. For instance, the entropy encoding module 130 may store a table used to perform entropy coding, for example, a variable length coding (VLC) table, and perform entropy encoding using the stored VLC table. Alternatively, in CABAC, the entropy encoding module 130 may binarize a symbol into a bin and perform arithmetic encoding on the bin based on a probability of the bin occurring, thereby generating a bit stream.

When entropy encoding is applied, a symbol with a high probability of occurrence may be allocated a low-value index and a corresponding short codeword, while a symbol with a low probability of occurrence may be allocated a high-value index and a corresponding long codeword. Thus, the amount of bits for symbols to be coded may be reduced and video compression performance may be enhanced by entropy coding.

The dequantization module 135 may perform dequantization on the values quantized by the quantization module 120, and the inverse transform module 140 may perform inverse transformation on the values inversely quantized by the dequantization module 135. The residual values generated from the dequantization module 135 and the inverse transform module 140 may be added to the prediction block predicted by the prediction module 110, thereby generating a reconstructed block.

The filter module 145 may apply an in-loop filter to the reconstructed block and/or picture. The in-loop filter may include a deblocking filter, a sample adaptive offset (SAO), and/or an adaptive loop filter (ALF).

The deblocking filter may remove block distortion occurring on boundaries between blocks in the reconstructed picture. The SAO may add a proper offset value to a pixel value so as to correct a coding error. The ALF can perform filtering based on a value obtained by comparing the picture, reconstructed after the block is filtered by the deblocking filter, with the original picture.

Meanwhile, the filter module 145 may not apply filtering to a reconstructed block used in inter prediction.

The memory 150 may store the reconstructed block or picture obtained through the filter module 145. The reconstructed block or picture stored in the memory 150 may be provided to the prediction module 110 for performing inter prediction.

Figure 2:
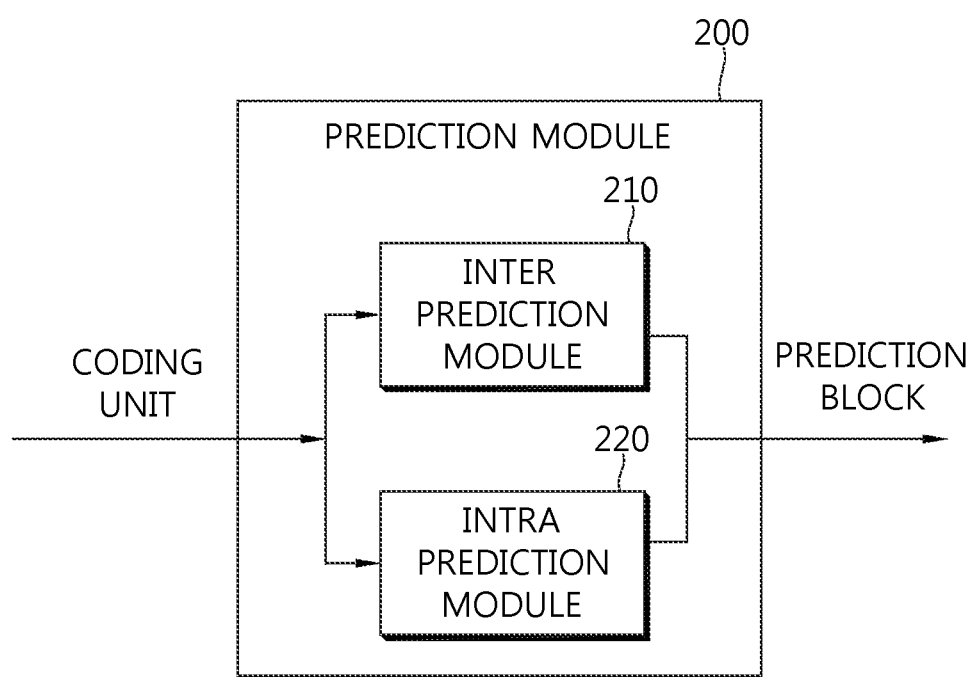
FIG. 2 is a block diagram schematically illustrating a prediction module according to an exemplary embodiment of the present invention.

FIG. 2 is a block diagram schematically illustrating a prediction module according to an exemplary embodiment of the present invention. Referring to FIG. 2, the prediction module 200 may include an inter prediction module 210 and an intra prediction module 220.

The inter prediction module 210 may perform prediction based on information on at least one of previous or subsequent pictures of a current picture to generate a prediction block. The intra prediction module 220 may perform prediction based on information on a pixel in the current picture to generate a prediction block.

The inter prediction module 210 may select a reference picture for a PU, and a reference block having the same size as the PU by an integer pixel sample unit. Subsequently, the inter prediction module 210 may generate a prediction block that is the most similar to the current PU to have a minimum residual signal and a minimum motion vector size, the prediction unit being generated in a sample unit smaller than an integer, such as a ½ pixel sample unit and a ¼ pixel sample unit. Here, the motion vector may be represented as a unit smaller than an integer pixel.

Information on an index of the reference picture selected by the inter prediction module 210 and the motion vector may be encoded and transferred to the decoder.

Figure 3:
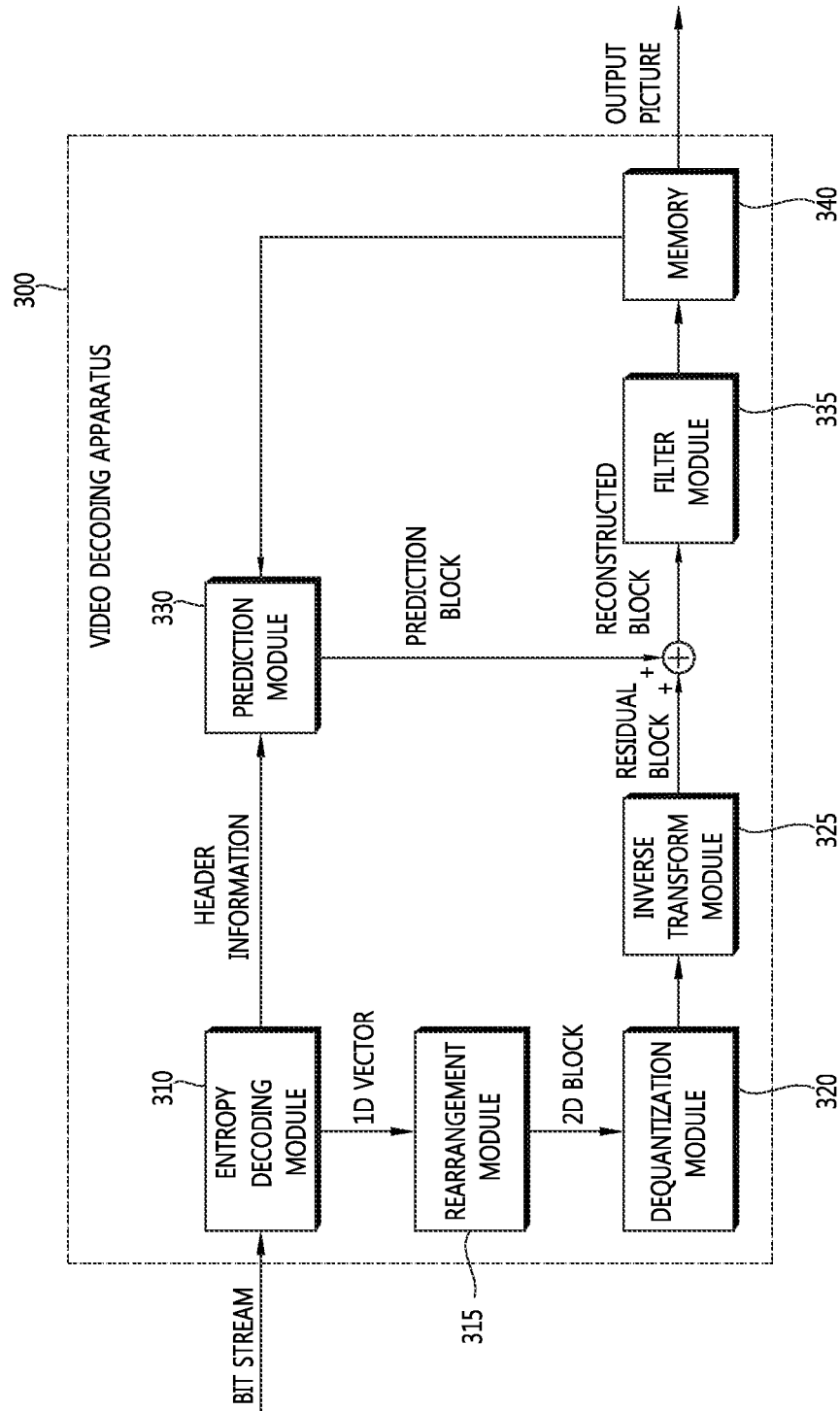
FIG. 3 is a block diagram schematically illustrating a video decoding apparatus according to an exemplary embodiment of the present invention.

FIG. 3 is a block diagram schematically illustrating a video decoding apparatus according to an exemplary embodiment of the present invention. Referring to FIG. 3, the video decoding apparatus 300 may include an entropy decoding module 310, a rearrangement module 315, an dequantization module 320, an inverse transform module 325, a prediction module 330, a filter module 335, and a memory 340.

When a video bit stream is input to the video encoding apparatus, the input video bit stream may be decoded according to a procedure by which the video encoding apparatus has processed video information.

The entropy decoding module 310 may perform entropy decoding on the input bit stream, and an entropy decoding method is similar to the entropy encoding method described above. When entropy decoding is applied, a symbol with a high probability of occurrence may be allocated a low-value index and a corresponding short codeword, while a symbol with a low probability of occurrence may be allocated a high-value index and a corresponding long codeword. Thus, the amount of bits for symbols to be coded may be reduced and video compression performance may be enhanced by entropy coding.

Information for generating a prediction block among information decoded by the entropy decoding module 310 may be provided to the prediction module 330, and residual values on which entropy decoding has been performed by the entropy decoding module may be input to the rearrangement module 315.

The rearrangement module 315 may rearrange the bit stream on which entropy decoding has been performed by the entropy decoding module 310 based on a rearrangement method used in the video encoding apparatus. The rearrangement module 315 may rearrange coefficients represented in a one-dimensional vector form by reconstructing the coefficients into coefficients of a two-dimensional block form. The rearrangement module 315 may receive information related to coefficient scanning performed by the encoding apparatus and perform rearrangement using an inverse scanning method based on a scanning order used by the corresponding encoding apparatus.

The dequantization module 320 may perform dequantization based on quantization parameters and coefficient values of a rearranged block provided by the encoding apparatus.

The inverse transform module 325 may perform inverse DCT and/or inverse DST on DCT and DST performed by the transform module of the encoding apparatus, relative to quantization results performed by the video encoding apparatus. Inverse transform can be performed based on a transmission unit or a partition unit of a picture as determined by the encoding apparatus. In the transform module of the encoding apparatus, DCT and/or DST may be selectively performed based on a plurality of factors, such as a prediction method, the size of the current block and/or a prediction direction. The inverse transform module 325 of the decoding apparatus can perform inverse transform based on transform information resulting from the transform module of the encoding apparatus.

The prediction module 330 may generate a prediction block based on information about the generation of the prediction block provided by the entropy decoding module 310 and information on a previously decoded block and/or picture provided by memory 340. A reconstructed block may be generated using the prediction block generated by the prediction module 330 and the residual block provided by the inverse transform module 325.

The reconstructed block and/or picture may be provided to the filter module 335. The filter module 335 may apply an in-loop filter to the reconstructed block and/or picture. The in-loop filter may include a deblocking filter, an SAO and/or an ALF.

The memory 340 may store the reconstructed picture or block so that the reconstructed picture or block may be used as a reference picture or a reference block, and may also supply the reconstructed picture to an output module.

Figure 4:
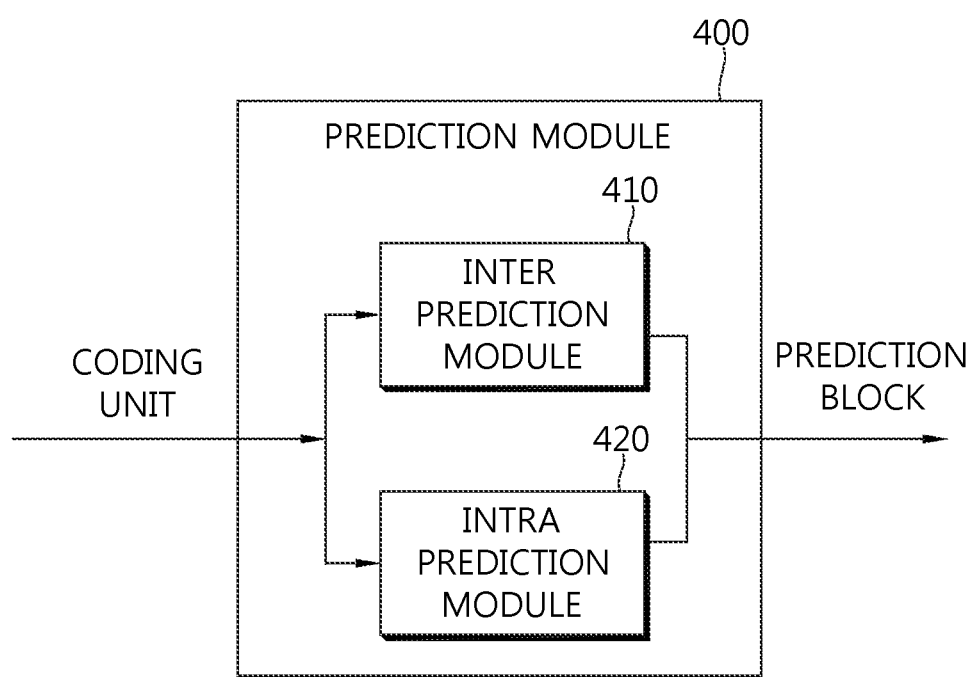
FIG. 4 is a block diagram schematically illustrating a prediction module of the video decoding apparatus according to an exemplary embodiment of the present invention.

FIG. 4 is a block diagram schematically illustrating a prediction module of the video decoding apparatus according to an exemplary embodiment of the present invention.

Referring to FIG. 4, the prediction module 400 may include an intra prediction module 410 and an inter prediction module 420.

The intra prediction module 410 may generate a prediction block based on information on a pixel in a current picture when a prediction mode for a corresponding PU is an intra prediction mode.

The inter prediction module 420 may perform inter prediction on a current PU based on information included in at least one of previous or subsequent pictures of a current picture including the current PU using information needed for inter prediction of the current PU provided from the video encoding apparatus, for example, information about a motion vector and a reference picture index, when a prediction mode for a corresponding PU is an inter prediction mode.

Here, when a skip flag or merge flag of a CU received from the encoding apparatus is identified, motion information may be derived according to the identified flag.

Hereinafter, when "video" or "screen" indicate the same meaning as "picture" based on a configuration or expression of the invention, "picture" may be replaced with "video" or "screen." Further, inter prediction refers to inter frame prediction, and intra prediction refers to intra frame prediction.

As described above with reference to FIGS. 2 and 4, the intra prediction module may perform prediction based on the information on the pixel in the current picture to generate the prediction block with respect to the current block. For example, the intra prediction module may predict pixel values of the current block using pixels in reconstructed blocks disposed to top, left, top left and/or top right sides from the current block. Here, a processing unit on which prediction is performed may be different from a processing unit on which a prediction method and a detail thereof is determined. For example, a prediction method and a prediction mode may be determined on a PU, and prediction may be performed on a TU.

Intra prediction may be carried out based on an intra prediction mode for each PU within the current block (for example, CU). The intra prediction mode may include vertical, horizontal, DC, planar and angular modes according to locations of reference pixels used to predict a pixel value of the current block and/or prediction method. In the vertical mode, prediction may be performed in the vertical direction using pixel values of an adjacent block. In the horizontal mode, prediction may be performed in the horizontal direction using pixel values of an adjacent block. In the DC mode, a prediction block may be generated using an average pixel value of reference pixels. In the angular mode, prediction may be performed according to an angle and/or direction defined in advance for each mode. For intra prediction, a predetermined prediction direction and prediction mode value may be used.

When a prediction mode for the current block is an intra mode, the encoding apparatus and the decoding apparatus may use an intra pulse code modulation (I_PCM) mode for lossless encoding, in addition to the intra prediction mode. When the I_PCM mode is applied to the current block, the encoding apparatus may transmit pixel values in the current block to the decoding apparatus as they are without prediction, transform and/or quantization. Here, the pixel values in the current block may be coded, for example, in raster scan order, and transmitted to the decoding apparatus. The decoding apparatus may not perform prediction, inverse scaling, inverse transform and/or dequantization on the I_PCM mode-applied block. Here, the decoding apparatus may parse the pixel values transmitted from the encoding apparatus and derive a pixel value in a reconstructed block straight from the parsed pixel values.

When the I-PCM mode is used, the encoding apparatus may transmit information on whether the I-PCM mode is applied to the current block (for example, CU) to the decoding apparatus. The information may be indicated, for example, by a PCM flag. Here, the PCM flag may be a flag to indicate whether the I-PCM mode is applied to the current CU, i.e., whether the current CU is coded by the I_PCM. In one exemplary embodiment, the flag may be represented by pcm flag. The encoding apparatus may entropy-encode the flag and transmit the flag to the decoding apparatus. Here, the decoding apparatus may receive and decode the encoded PCM flag and determine whether the I_PCM mode is applied to the current CU using the decoded PCM flag.

As described above, when the pixel values in the current CU are coded by I-PCM, the decoding apparatus may not perform prediction, inverse scaling, inverse transform and/or dequantization on the current CU. Here, the decoding apparatus may parse the pixel values transmitted from the encoding apparatus and derive a reconstructed pixel value from the parsed pixel values. Here, the reconstructed pixel value may refer to a pixel value reconstructed before the in-loop filter is applied.

Meanwhile, a video signal may generally include three color signals that represent sizes of three primary color components of light. The three color signals may be represented by red (R), green (G) and blue (B). To reduce a frequency band used for video processing, the R, G and B signals may be transformed into luma and chroma signals equivalent to the R, G and B signals. Here, the video signal may include one luma signal and two chroma signals. Here, the luma signal is a component to represent a luminance of a screen, while the chroma signals are a component to represent a color of the screen. The luma signal may be represented by L, while the two chroma signals may be represented by Cb and Cr, respectively. Since a human eye is sensitive to the luma signal but insensitive to the chroma signals, one picture or block may include a fewer number of pixels of a chroma component than that of pixels of a luma component. In a 4:2:0 video format, a number of pixels of a chroma component block corresponding to a luma component block may be ½ of a number of pixels of the luma component block in a horizontal direction and ½ of a number of pixels of the luma component in a vertical direction.

When the current CU is encoded by the I_PCM mode, an example of deriving a reconstructed pixel value of a luma component may be represented as follows.

$$\text{for}(i = 0; i < currCodingUnitSize * currCodingUnitSize, i++)$$
$$R'L[xB + (i \% currCodingUnitSize),$$
$$yB + (i / currCodingUnitSize)] = \text{pcm\_sample\_luma}[i]$$

Here, currCodingUnitSize may denote a size of a current CU. currCodingUnitSize may be initialized to satisfy 1<<log 2CUSize, wherein log 2CUSize may be a logarithm of the size of the current CU. Further, R'L may be a reconstructed pixel value of a luma component before the in-loop filter (e.g., deblocking filter) is applied, that is, a luma reconstructed pixel value. (xB, yB) may be coordinates of a most top-left pixel in the current CU. pcm_sample_luma may be a pixel value of a luma component encoded in the I_PCM mode with respect to the current CU and transmitted to the decoding apparatus. Here, for instance, the pixel value of the luma component may be encoded in raster scan order.

When the current CU is encoded by the I_PCM mode, another example of deriving a reconstructed pixel value of a luma component may be represented as follows.

$$recSample_L[xB+i, yB+j] =$$
$$pcm\_sample\_luma[(nS*j)+i] << (BitDepth_Y - PCMBitDepth_Y),$$
$$\text{with } i, j = 0 \ldots nS-1$$

Here, nS may denote a size of a current CU. nS may be initialized to satisfy 1<<log 2CbSize, wherein log 2CbSize may be a logarithm of the size of the current CU. recSamples$_L$ may be a reconstructed pixel value of a luma component before the in-loop filter (e.g., deblocking filter) is applied, that is, a luma reconstructed pixel value. (xB, yB) may be coordinates of a top leftmost pixel in the current CU. pcm_sample_luma may be a pixel value of a luma component encoded in the I_PCM mode with respect to the current CU and transmitted to the decoding apparatus. Here, for instance, the pixel value of the luma component may be encoded in raster scan order. Further, PCMBitDepth$_Y$ may be a bit number used to indicate each pixel corresponding to pcm_sample_luma, and BitDepth$_Y$ may be a bit depth of pixels of the luma component in the current CU.

When the current CU is encoded by the I_PCM mode, an example of deriving a reconstructed pixel value of a chroma component may be represented as follows.

```
for( i = 0; i < currCodingUnitSizeC * currCodingUnitSizeC; i++ ) {
    R'Cb[ (xB >> 1) + ( i % currCodingUnitSizeC ),
        (yB >> 1) + ( i / currCodingUnitSizeC ) ]
        = pcm_sample_chroma[ i ]
}
for( i = 0; i < currCodingUnitSizeC * currCodingUnitSizeC; i++ ) {
    R'Cr[ (xB >> 1) + ( i % currCodingUnitSizeC ),
        (yB >> 1) + ( i / currCodingUnitSizeC ) ]
        = pcm_sample_chroma[ i + currCodingUnitSizeC *
currCodingUnitSizeC]
}
```

Here, currCodingUnitSizeC may denote a size of a chroma component block with respect to a current CU. currCodingUnitSizeC may be initialized to satisfy (1<<log 2CUSize)>>1, wherein log 2CUSize may be a logarithm of the size of the current CU. Further, R'Cb may be a reconstructed pixel value of a chroma component Cb before the in-loop filter (e.g., deblocking filter) is applied, that is, a chroma Cb reconstructed pixel value. R'Cr may be a reconstructed pixel value of a chroma component Cr before the in-loop filter (e.g., deblocking filter) is applied, that is, a chroma Cr reconstructed pixel value. pcm_sample_chroma may be a pixel value of a chroma component encoded in the I_PCM mode with respect to the current CU and transmitted to the decoding apparatus. Here, for instance, the pixel value of the chroma component may be encoded in raster scan order.

When the current CU is encoded by the I_PCM mode, another example of deriving a reconstructed pixel value of a chroma component may be represented as follows.

$$recSample_{Cb}[xB/2+i, yB/2+j] = pcm\_sample\_chroma[(nS/2*j)+i]$$
$$<< (BitDepth_C - PCMBitDepth_C) \text{ with } i, j = 0 \ldots nS/2-1$$
$$recSample_{Cr}[xB/2+i, yB/2+j] =$$
$$pcm\_sample\_chroma[(nS/2*(j+nS))+i]$$
$$<< (BitDepth_C - PCMBitDepth_C) \text{ with } i, j = 0 \ldots nS/2-1$$

Here, recSamples$_{Cb}$ may be a reconstructed pixel value of a chroma component Cb before the in-loop filter (e.g., deblocking filter) is applied, that is, a chroma Cb reconstructed pixel value. recSamples$_{Cr}$ may be a reconstructed pixel value of a chroma component Cr before the in-loop filter (e.g., deblocking filter) is applied, that is, a chroma Cr reconstructed pixel value. pcm_sample_chroma may be a pixel value of a chroma component encoded in the I_PCM mode with respect to the current CU and transmitted to the decoding apparatus. Here, for instance, the pixel value of the chroma component may be encoded in raster scan order. Further, PCMBitDepth$_C$ may be a bit number used to indicate each pixel corresponding to pcm_sample_chroma, and BitDepth$_C$ may be a bit depth of pixels of the chroma component in the current CU.

According to the foregoing method of deriving the reconstructed pixel value, the decoding apparatus may parse the pixel values transmitted from the encoding apparatus and copy the parsed pixel values (pcm_sample_luma, pcm_sample_chroma) as they are for use as reconstructed pixel values. When the I-PCM mode is applied to the current CU, the encoding apparatus may code the pixel values in the current CU as they are without prediction, transform and/or quantization and transmit the pixel values to the decoding apparatus. Thus, the I_PCM mode is a lossless encoding mode, and the decoding apparatus may parse the transmitted pixel values and derive the reconstructed pixel values straight from the parsed pixel values.

Meanwhile, to make up for a difference between an original picture and a reconstructed picture by an error that occurs a compression encoding process, such as quantization, the in-loop filter may be applied for the reconstructed picture. As described above, in-loop filtering may be carried out by the filter modules of the encoding apparatus and the decoding apparatus, wherein the filter modules may apply at least one of a deblocking filter, an SAO and an ALF for the reconstructed picture.

Figure 5:
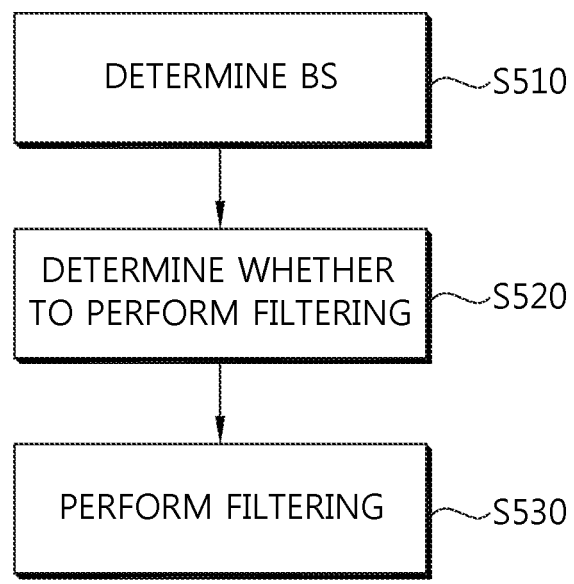
FIG. 5 is a flowchart schematically illustrating a deblocking filtering process according to an exemplary embodiment of the present invention.

FIG. 5 is a flowchart schematically illustrating a deblocking filtering process according to an exemplary embodiment of the present invention.

As described above, the encoding apparatus and the decoding apparatus may reconstruct a video based on a block unit. When the video is reconstructed based on the block unit, block distortion may occur on boundaries between blocks in the reconstructed picture. Thus, the encoding apparatus and the decoding apparatus may use a deblocking filter to remove the block distortion occurring on the boundaries between the blocks in the reconstructed picture.

A deblocking filtering process may be applied to edges of any PU and edges of any CU within the picture. Here, the deblocking filtering process may not be applied to edges on the boundary of the picture. Thus, the encoding apparatus and the decoding apparatus may determine an area to be subjected to the deblocking filter. In detail, the encoding apparatus and the decoding apparatus may determine boundaries between CUs and boundaries between PUs to be subjected to the deblocking filter within a current block on the basis of information on the current block (location, width, height, depth, size and prediction partition mode).

Referring to FIG. 5, the encoding apparatus and the decoding apparatus may determine a boundary strength (bS) with respect to a boundary between blocks and/or an edge of a block based on the determined boundaries between the CUs and the determined boundaries between the PUs (S510). Here, bS may denote a boundary strength between blocks. In the following specification, an "edge" of one block may refer to a "boundary" between blocks for convenience unless specified otherwise.

One picture may include an area where block distortion easily occurs and an area where block distortion hardly occurs. Thus, the encoding apparatus and the decoding apparatus may determine a bS with respect to a boundary between blocks in consideration of a probability that block distortion occurs so as to increase encoding efficiency. For example, in the case where a bS value of a boundary (block edge) between a block P and a block Q is calculated, the encoding apparatus and the decoding apparatus may determine the bS value with respect to the boundary based on whether the deblocking filter is applied to the boundary, a direction of the block edge, locations of the blocks and/or whether the block P and the block Q are encoded in the intra mode.

Here, to be mentioned later, the encoding apparatus and the decoding apparatus may perform filtering in different methods on a boundary of an area with a high probability that block distortion occurs and a boundary of an area with a low probability that block distortion occurs within the same picture, thereby enhancing encoding efficiency.

When the bS is determined, the encoding apparatus and the decoding apparatus may determine whether to perform filtering (S520).

In the case where the bS value of the boundary (block edge) between the block P and the block Q is calculated, the encoding apparatus and the decoding apparatus may determine whether to perform filtering on the basis of a linearity between a sample line within the block P and a sample line in the block Q.

Here, the encoding apparatus and the decoding apparatus may determine whether to perform filtering based on a pixel value on the sample line within the block P, a pixel value on the sample line within the block Q, and a variable $\beta$. The encoding apparatus may perform calculation according to a preset method using the pixel value on the sample line in the block P and the pixel value on the sample line in the block Q, thereby deriving a positive variable d. Here, when the variable d is smaller than the variable $\beta$, the encoding apparatus may determine to perform filtering. Here, the variable $\beta$ may be determined based on a quantization parameter (QP) of the current CU. The variable $\beta$ becomes greater as the QP increases. For instance, when the QP is 0, the variable $\beta$ may be determined to be 0. Thus, when the QP of the current CU is 0, the variable d is always equivalent to or greater than the variable $\beta$, and thus the encoding apparatus and the decoding apparatus may determine not to perform filtering.

Returning to FIG. 5, the encoding apparatus and the decoding apparatus may perform deblocking filtering according to the bS value and the determination of whether to perform filtering (S530).

The encoding apparatus and the decoding apparatus may determine a filter to be used for the boundary between the blocks and/or the edge of the block based on the determined bS value. The filter may be classified into a strong filter and a weak filter. That is, the encoding apparatus and the decoding apparatus may determine a strong filter or weak filter as the filter to be used for the boundary between the blocks and/or the edge of the block. Here, the encoding apparatus and the decoding apparatus perform filtering in different methods on a boundary of an area with a high probability that block distortion occurs and a boundary of an area with a low probability that block distortion occurs within the same picture, thereby enhancing encoding efficiency.

When determining to perform filtering in step S520 of determining whether to perform filtering, the encoding apparatus may perform deblocking filtering on the boundary between the blocks and/or the edge of the block using the determined filter (for example, a strong filter or a weak filter).

Meanwhile, the encoding apparatus and the decoding apparatus may not perform deblocking filtering on a pixel in a block encoded in the I_PCM mode. For example, when the current CU is encoded in the I_PCM mode, the encoding apparatus and the decoding apparatus may omit a deblocking filtering process on pixels in the current CU. As described above, when the I_PCM mode is applied, the encoding apparatus may transmit the pixel values in the current block to the decoding apparatus as they are without prediction, transform and/or quantization. Here, the decoding apparatus may derive reconstructed pixel values, the same as those in original data, from the pixel values transmitted from the encoding apparatus. Thus, to reconstruct a video with optimal quality, an in-loop filtering (e.g., deblocking filtering, SAO and ALF) process may need omitting.

In one exemplary embodiment, when the current CU is encoded by I_PCM, the encoding apparatus and the decoding apparatus may determine not to perform deblocking filtering on the pixels in the CU in step S520 of determining whether to perform filtering. To this end, the encoding apparatus and the decoding apparatus may assume that the QP of the current CU is 0 and determine the variable $\beta$. Here, the variable $\beta$ may be determined as 0, and the encoding apparatus and the decoding apparatus may determine not to perform filtering. That is, in this case, the encoding apparatus and the decoding apparatus may omit the deblocking filtering process. Here, whether the current CU is encoded by I_PCM may be determined, for example, based on a PCM flag.

In another exemplary embodiment, the encoding apparatus and the decoding apparatus may determine a reconstructed pixel value, which is not subjected to deblocking filtering, with respect to a pixel in a block encoded in the I_PCM mode (for example, a CU) as a final pixel value in the deblocking filtering process. Accordingly, the encoding apparatus and the decoding process may omit the deblocking filtering process. Hereinafter, a block encoded in the I_PCM mode is referred to as an I_PCM block.

Here, it may be determined based on a PCM loop filter flag whether the reconstructed pixel value not subjected to deblocking filtering with respect to the I_PCM block is determined as the final pixel value. The PCM loop filter flag may be a flag to instruct whether to apply the in-loop filter to the I_PCM block. In one exemplary embodiment, the flag may be pcm loop filter disable flag. The encoding apparatus may transmit PCM loop filter flag information about a video sequence to the decoding apparatus, and the decoding apparatus may determine whether to apply the deblocking filter based on the transmitted PCM loop filter flag information.

Meanwhile, as described above, the filter modules of the encoding apparatus and the decoding apparatus may adopt an SAO filter as the in-loop filter in addition to the deblocking filter. SAO filtering may be an in-loop filtering process to compensate a deblocking-filtered image by a pixel unit for an offset difference from an original picture. SAO filtering is to compensate for a coding error, which may be caused by quantization. An SAO may be classified into two types, which are a band offset and an edge offset.

Figure 6:
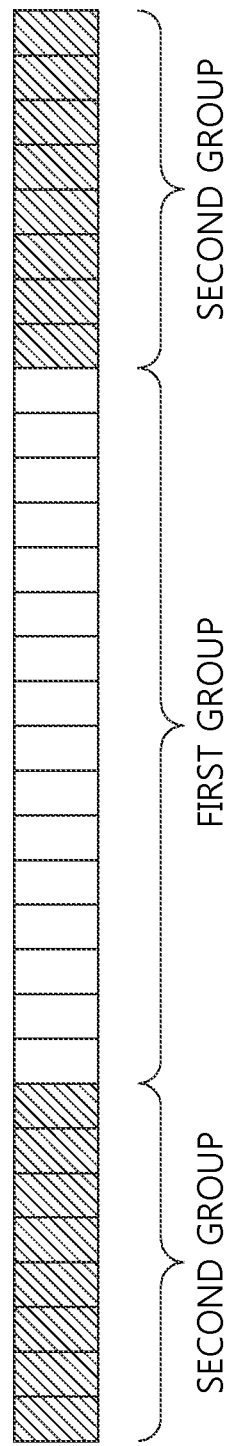
FIG. 6 is a diagram schematically illustrating a band offset.

FIG. 6 is a diagram schematically illustrating a band offset.

To apply a band offset, pixels in an SAO-applied unit may be classified according to an intensity of each pixel. A whole intensity range may be divided into a predetermined number of intensity intervals, i.e., bands. Each band may include pixels having an intensity within each intensity interval. Here, an offset may be determined for each band.

A video formed of N-bit pixels may have an intensity range of 0 to $2^N-1$. For instance, 8-bit pixels may have an intensity range of 0 to 255. FIG. 6 shows that a whole intensity range is divided into 32 bands having the same intensity interval.

Referring to FIG. 6, each band may have an intensity range of, for example, 8. The 32 bands may be divided into a central first group and a neighboring second group. The first group may include 16 bands, and the second group may also include 16 bands. An offset may be applied for each band, and an offset value for each band may be transmitted to the decoding apparatus.

The decoding apparatus may group pixels and apply the transmitted offset value for each band in the same manner as the encoding apparatus applies a band offset.

A second SAO type is an edge offset mode considering edge information by a pixel. The edge offset mode may be applied in consideration of an edge direction based on a current pixel, and intensities of the current pixels and neighboring pixels.

There are four representative directional edges in a block. The four directional edges may include, for example, a 0-degree edge, a 90-degree edge, a 135-degree edge and a 45-degree edge. Thus, the edge offset for each filtering unit based on an angle or direction of an edge, that is, four types for an SAO application unit, may be used. Hereinafter, the four kinds of edges for the SAO application unit may be referred to as edge types of the edge offset for convenience of description.

Figure 7:
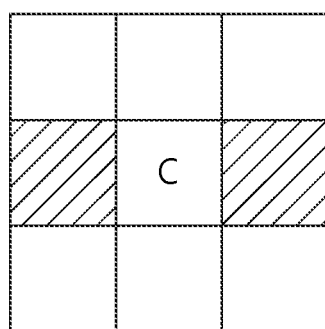
FIG. 7 is a block diagram illustrating four representative edge types of an edge offset based on a current pixel (C).
Figure 7:
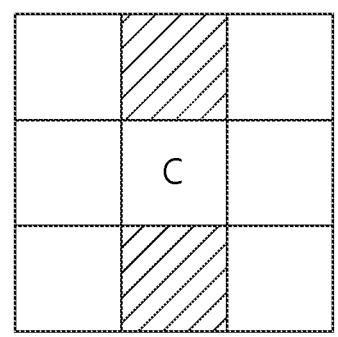
Figure 7:
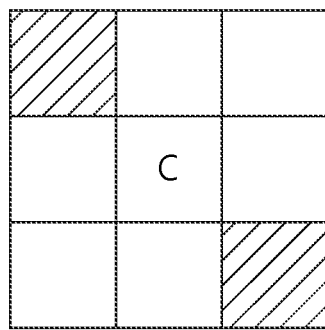
Figure 7:
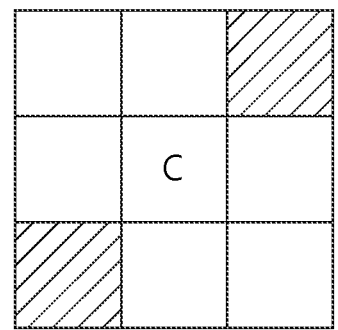

FIG. 7 is a block diagram illustrating four representative edge types of the edge offset based on a current pixel (C). Referring to FIG. 7, (a) is a one-dimensional (1D) 0-degree edge, (b) is a 1D 90-degree edge, (c) is a 1D 135-degree edge, and (d) is a 1D 45-degree edge. Four edge offsets may be used based on the four directional edge types shown in FIG. 7. That is, an offset corresponding to one of the four edge types may be applied to each SAO application unit.

When an edge type is determined, a relationship between the current pixel and a neighboring pixel may be considered to apply an edge offset.

Figure 8:
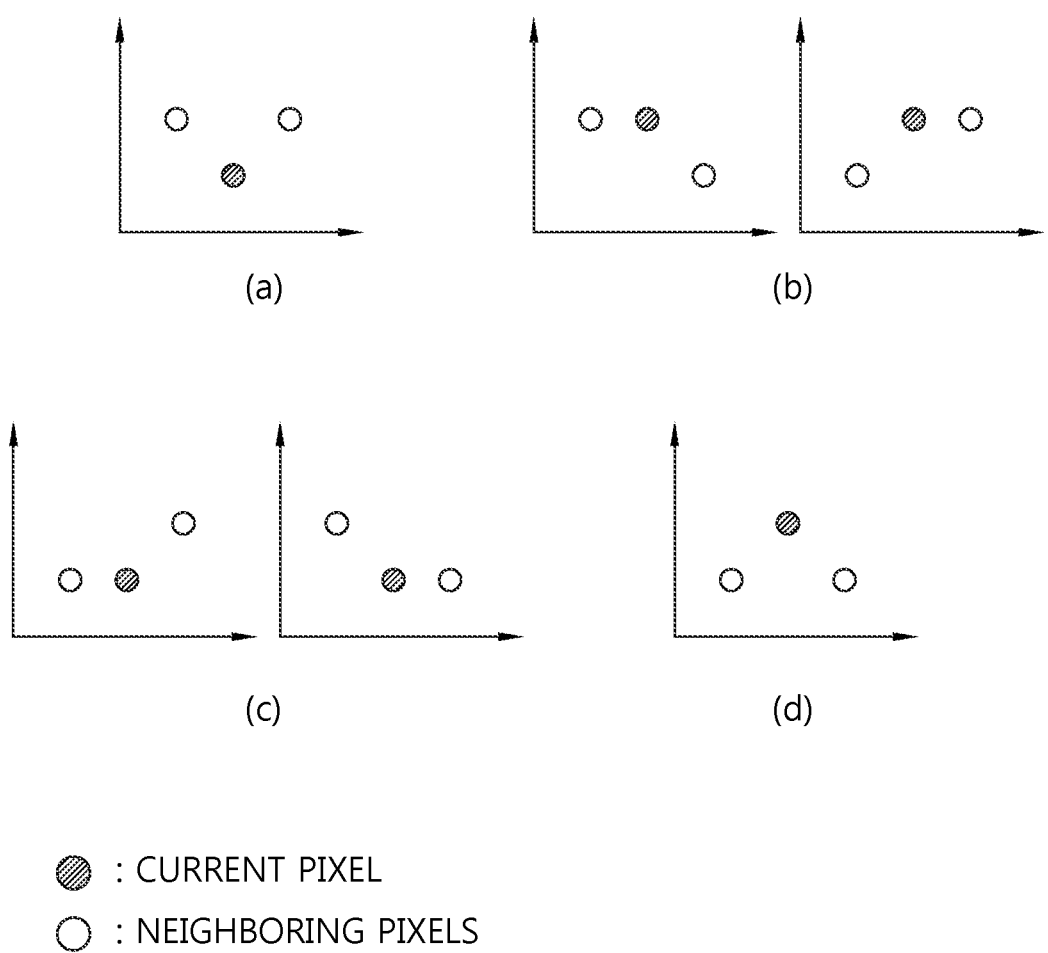
FIG. 8 schematically illustrates that a result of comparing intensities of the current pixel and neighboring pixels is divided into four categories.

FIG. 8 schematically illustrates that a result of comparing intensities of the current pixel and neighboring pixels is divided into four categories.

FIGS. 8(a) to 8(d) show distributions of the current pixel (C) and neighboring pixels in the respective categories. FIG. 8(a) illustrates a category when intensities of two neighboring pixels are greater than an intensity of the current pixel (C). FIG. 8(b) illustrates a category when an intensity of one of two neighboring pixels is smaller than the intensity of the current pixel. FIG. 8(c) illustrates a category when an intensity of one of two neighboring pixels is greater than the intensity of the current pixel. FIG. 8(d) illustrates a category when the intensities of two neighboring pixels are smaller than an intensity of the current pixel.

For example, FIGS. 8(a) and 8(d) show that the intensity of the current pixel is greater or smaller than the intensity of the neighboring pixels. Further, FIGS. 8(b) and 8(c) may occur when the current pixel is located on a boundary of a particular area.

Table 1 schematically illustrates the four categories shown in FIG. 8.

TABLE 1

| Category | Condition |
|---|---|
| 1 | Intensity of C < Intensity of 2 neighboring pixels |
| 2 | Intensity of C < Intensity of 1 neighboring pixel & Intensity of C = Intensity of 1 neighboring pixel |
| 3 | Intensity of C > Intensity of 1 neighboring pixel & Intensity of C = Intensity of 1 neighboring pixel |
| 4 | Intensity of C > Intensity of 2 neighboring pixels |
| 0 | None of the above |

In Table 1, C represents the current pixel. Also, category 1 corresponds to FIG. 8(a), category 2 corresponds to FIG. 8(b), category 3 corresponds to FIG. 8(c), and category 4 corresponds to FIG. 8(d).

The encoding apparatus may transmit an edge offset value in each category. The decoding apparatus may add each pixel and an edge offset value corresponding to an edge type and a category to reconstruct a pixel. For instance, the decoding apparatus may determine which mode the current pixel belongs to among the four edge types of FIG. 7 and which category the current pixel belongs to among the categories of Table 1 and apply an offset in the corresponding category to the current pixel.

Meanwhile, the SAO process is a process that is performed on the entire slice and/or picture. If the I_PCM mode is applied to the current CU, the encoding apparatus may transmit the pixel values in the current CU to the decoding apparatus as they are without prediction, transform and/or quantization. Here, since the decoding apparatus can derive reconstructed pixel values the same as those of the original data from the pixel values transmitted from the encoding apparatus, it may be more efficient not to perform the SAO process.

Thus, the encoding apparatus and the decoding apparatus may not perform the SAO process on pixels within a block encoded in the I_PCM mode during the SAO application process. That is, the encoding apparatus and the decoding apparatus may omit the SAO process on the pixels in the I_PCM block. Omission of the SAO process based on whether the block is in the I_PCM mode may be applied to at least one of the band offset type and the edge offset type. Here, it may be determined based on, for example, the PCM flag and/or PCM loop filter flag, whether the SAO is applied.

For instance, the encoding apparatus and the decoding apparatus may determine not to perform the SAO process on a pixel in a block encoded in the I_PCM mode. Further, the encoding apparatus and the decoding apparatus may determine a reconstructed pixel value not subjected to the SAO as a final pixel value in the SAO process with respect to the pixel in the block encoded in the I_PCM mode.

Meanwhile, as described above, the filter modules of the encoding apparatus and the decoding apparatus may also employ an ALF as an in-loop filter in addition to the deblocking filter and the SAO. The ALF may perform filtering based on a value obtained by comparing a reconstructed picture via deblocking filtering and/or SAO filtering and an original picture.

Figure 9:
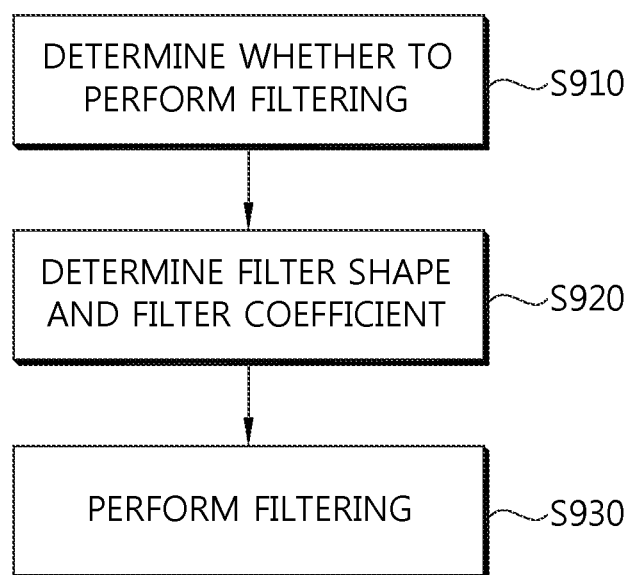
FIG. 9 is a flowchart schematically illustrating an adaptive loop filtering process according to an exemplary embodiment of the present invention.

FIG. 9 is a flowchart schematically illustrating an adaptive loop filtering process according to an exemplary embodiment of the present invention.

An ALF may compensate for a coding error using a Wiener filter and be applied globally in a slice. The ALF may be applied after the SAO is applied and be applied only in high efficiency (HE).

Referring to FIG. 9, the encoding apparatus and the decoding apparatus may determine whether to apply adaptive loop filtering (S910).

Information about whether to perform filtering may be included in a bit stream and transmitted from the encoding apparatus to the decoding apparatus. For instance, the encoding apparatus may transmit ALF flag information indicating whether adaptive loop filtering is performed on each CU to the decoding apparatus. Here, the ALF flag information may be a flag to instruct whether adaptive loop filtering is performed on the current CU and be represented by, for example, alf_cu_flag. That is, the ALF flag information may be CU-unit on/off information about the ALF. The decoding apparatus may determine whether to apply the ALF for each CU unit using the transmitted ALF flag information.

The information about whether to perform filtering may include CU-unit control flag information. That is, the encoding apparatus may include the CU-unit control flag information in the bit stream to transmit the information to the decoding apparatus. Here, the CU-unit control flag may be a flag to determine whether to perform filtering by each CU, i.e., to instruct whether the ALF is adaptively applied to each CU. For example, the CU-unit control flag may be represented by alf_cu_control_flag.

For example, when alf_cu_control_flag has a value of 1, the encoding apparatus and the decoding apparatus may determine whether to apply the ALF to the current CU based on a value of an ALF flag (for example, alf_cu_flag). That is, when alf_cu_control_flag has a value of 1, the encoding apparatus and the decoding apparatus may turn on/off the ALF process by the CU based on the value of the ALF flag. When alf_cu_control_flag has a value of 0, a CU corresponding to alf_cu_control_flag may not have ALF flag information. That is, there is no CU-unit on/off information about the ALF.

Meanwhile, the encoding apparatus and the decoding apparatus may not perform the ALF process on a pixel in a block encoded in the I_PCM mode. That is, the current CU is encoded in the I_PCM mode, the encoding apparatus and the decoding apparatus may omit the ALF process on the pixels in the current CU. As described above, when the I_PCM mode is applied, the encoding apparatus may transmit the pixel values in the current CU to the decoding apparatus as they are without prediction, transform and/or quantization. Here, the decoding apparatus can derive reconstructed pixel values the same as those of the original data from the pixel values transmitted from the encoding apparatus. Thus, in-loop filtering (for example, deblocking filtering, SAO and ALF) may be omitted to reconstruct a video with optimal quality.

In one embodiment, when the current CU is encoded in the I_PCM mode, the encoding apparatus and the decoding apparatus may determine not to perform the ALF process to the pixels in the CU. Here, it may be determined based on, for example, the PCM flag and PCM loop filter flag, whether the current CU is encoded in the I_PCM mode. The PCM flag and the PCM loop filter flag have been described above, and descriptions thereof are omitted herein.

When the current CU is encoded in the I_PCM mode, the encoding apparatus and the decoding apparatus may determine whether to apply the ALF based on the value of the CU-unit control flag (for example, alf_cu_control_flag, hereinafter, referred to as "alf_cu_control_flag") according to a different method.

As described, when alf_cu_control_flag has a value of 1, the encoding apparatus and the decoding apparatus may determine whether to apply the ALF to the current CU based on the value of the ALF flag (for example, alf_cu_flag, hereinafter, referred to "alf_cu_flag"). Here, the encoding apparatus may allocate a value of 0 to alf_cu_flag with respect to the CU encoded in the I_PCM mode to transmit alf_cu_flag to the decoding apparatus. In this case, the decoding apparatus may determine whether to apply the ALF based on the value of alf_cu_flag, thereby omitting the ALF process on the CU encoded in the I_PCM mode. Alternatively, when alf_cu_control_flag has a value of 1, the encoding apparatus and the decoding apparatus may ignore the value of alf_cu_flag and the ALF process with respect to the CU encoded in the I_PCM mode.

When alf_cu_control_flag has a value of 0, a CU corresponding to alf_cu_control_flag may not have ALF flag information. That is, there is no CU-unit on/off information about the ALF. Here, the encoding apparatus and the decoding apparatus may infer that the value of alf_cu_flag is 0 with respect to the CU encoded in the I_PCM mode and omit the ALF process.

Returning to FIG. 9, the encoding apparatus and the decoding apparatus may determine a filter shape and a filter coefficient (S920).

When the ALF process is determined to be performed, the encoding apparatus and the decoding apparatus may determine a filter shape and a filter coefficient. Information about the filter shape and/or filter coefficient may be transmitted through a slice header from the encoding apparatus to the decoding apparatus. For example, the filter coefficient may be calculated in the encoding apparatus, where one or more filter coefficients may be provided.

When the filter shape and the filter coefficient are determined, the encoding apparatus and the decoding apparatus may perform adaptive loop filtering on a pixel of a reconstructed picture based on the determined filter shape and filter coefficient (S930). Here, the reconstructed picture may be a video which has been subjected to deblocking filtering and/or SAO process.

Figure 10:
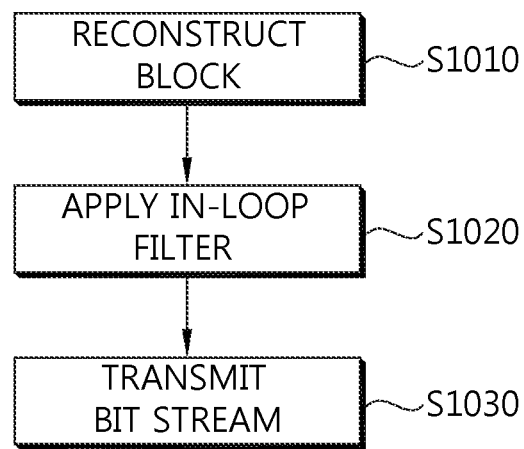
FIG. 10 is a flowchart schematically illustrating an operation of the encoding apparatus in a system to which the present invention is applied.

FIG. 10 is a flowchart schematically illustrating an operation of the encoding apparatus in a system to which the present invention is applied.

Referring to FIG. 10, the encoding apparatus may reconstruct a block (S1010). For example, the encoding apparatus may transform, quantize a prediction block and dequantize and inverse-transform a residual block generated based on the prediction block and a current block, thereby generating a reconstructed residual block. The encoding apparatus may generate a reconstructed block based on the reconstructed residual block and the prediction block. Alternatively, when the I_PCM mode is applied to the current block, the encoding apparatus may not perform prediction, transform and/or quantization. Here, the encoding apparatus may code pixel values in the current block as they are to transmit the pixel values to the decoding apparatus and generate a reconstructed block directly from the pixel values in the current block.

Subsequently, the encoding apparatus may apply an in-loop filter to the reconstructed block (S1020). The in-loop filter may be used in the filter module of FIG. 1, wherein the filter module may employ a deblocking filter, an SAO or an ALF. Here, the encoding apparatus may not apply at least one of the deblocking filter, the SAO and the ALF to a block encoded in the I_PCM mode and/or pixels in the I_PCM block, which has been described in detail as above.

The encoding apparatus may transmit a bit stream including deblocking filter, SAO and/or ALF-applied video information and video information about the in-loop filter to the decoding apparatus (S1030).

Figure 11:
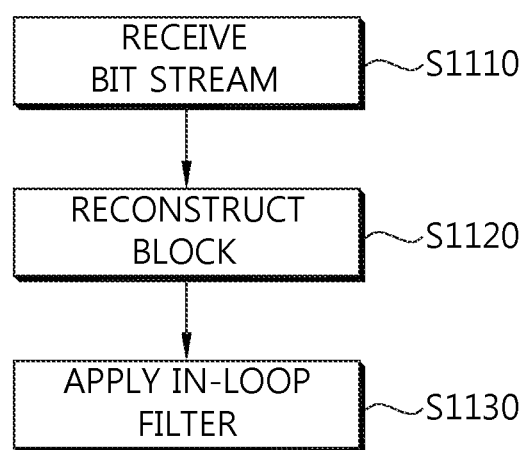
FIG. 11 is a flowchart schematically illustrating an operation of the decoding apparatus in a system to which the present invention is applied.

FIG. 11 is a flowchart schematically illustrating an operation of the decoding apparatus in a system to which the present invention is applied.

Referring to FIG. 11, the decoding apparatus may receive a bit stream from the encoding apparatus (S1110). The received bit stream may include not only video information but information needed for reconstruction of the video information.

The decoding apparatus may reconstruct a block based on the received information (S1120). For example, the decoding apparatus may generate a reconstructed block based on a prediction block generated by prediction and a residual block generated via dequantization and inverse transform. Alternatively, when the I_PCM mode is applied to a current block, the decoding apparatus may not perform prediction, transform and/or quantization. Here, the encoding apparatus may code pixel values in the current block as they are to transmit the pixel values to the decoding apparatus, while the decoding apparatus may generate the reconstructed block directly from the transmitted pixel values.

Subsequently, the decoding apparatus may apply an in-loop filter to the reconstructed block (S1130). The in-loop filter may be used in the filter module of FIG. 3, wherein the filter module may employ a deblocking filter, an SAO or an ALF. Here, the decoding apparatus may not apply at least one of the deblocking filter, the SAO and the ALF to a block encoded in the I_PCM mode and/or pixels in the I_PCM block, which has been described in detail as above.

In the in-loop filtering process described above, the encoding apparatus and the decoding apparatus may process to clipping and/or rounding for outputs generated respectively by the deblocking filter, the SAO and the ALF. Here, clipping may denote a process of cutting a random value to a value within a specific range. For example, a clipping operation may be represented by clip3(x, y, z). Here, when z is smaller than x, clip3(x, y, z) may have x; when z is greater than y, clip3(x, y, z) may have y. Otherwise, clip3(x, y, z) may have z. The clipping process may limit the output respectively via the deblocking filter, the SAO and the ALF to values within a specific range.

In one embodiment, suppose that a bit number used to indicate each pixel in an input video, that is, a bit depth, is 8 bits. Here, the encoding apparatus and the decoding apparatus may perform deblocking filtering and then perform clipping on each deblocking-filtered pixel value to a value within a 8-bit range. Also, the encoding apparatus and the decoding apparatus may perform the SAO process and then perform clipping on each SAO-applied pixel value to a value within a 8-bit range. Likewise, the encoding apparatus and the decoding apparatus may perform the ALF process and then perform clipping on each ALF-applied pixel value to a value within a 8-bit range.

As described above, the clipping process may be applied with respect to all of the deblocking filter, the SAO and the ALF. Alternatively, the clipping process may be applied with respect to some of the deblocking filter, the SAO and the ALF, without being limited to the foregoing embodiment.

A plurality of clipping and/or rounding processes may enable the outputs via the deblocking filter, the SAO and the ALF to be limited to a value within the 8-bit range. However, the clipping and/or rounding processes may cause loss of output accuracy and decrease coding efficiency. Thus, an in-loop filtering process may be provided to remove an unnecessary clipping process.

Figure 12:
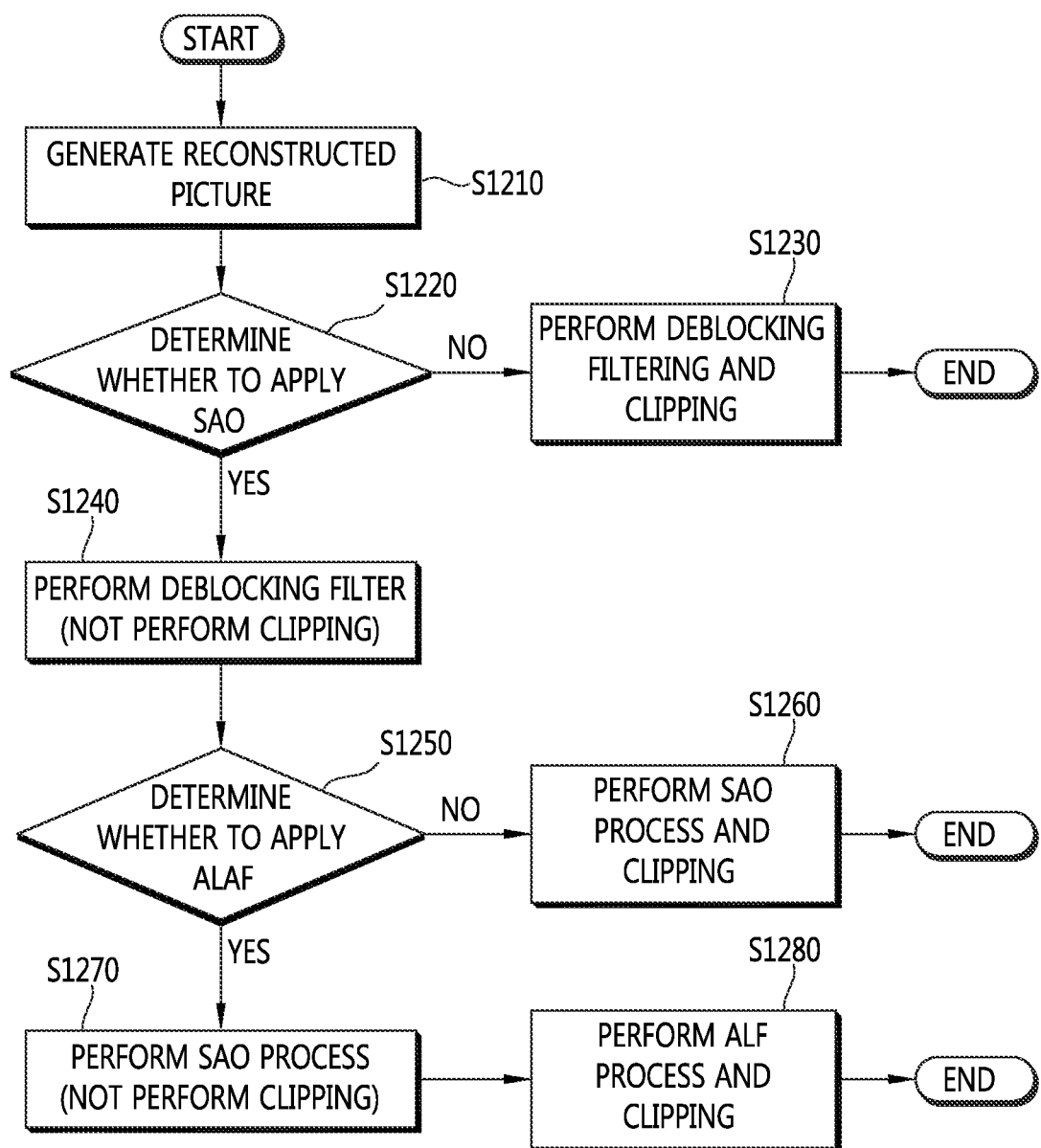
FIG. 12 is a flowchart schematically illustrating an in-loop filtering process according to an exemplary embodiment of the present invention.

FIG. 12 is a flowchart schematically illustrating an in-loop filtering process according to an exemplary embodiment of the present invention.

As described above, the encoding apparatus and the decoding apparatus may apply an in-loop filter to a reconstructed picture. The in-loop filter applied to the reconstructed picture may include at least one of a deblocking filter, an SAO and an ALF.

The encoding apparatus and the decoding apparatus may perform clipping in each process (deblocking filtering, SAO and ALF) of in-loop filtering. In this case, however, loss of output accuracy and decreased in coding efficiency may be involved. Thus, the encoding apparatus and the decoding apparatus may perform clipping only in a final process and/or stage of in-loop filtering. In this case, clipping may not be performed in other filtering processes than the final filtering process. For example, when all of deblocking filtering, SAO and ALF are applied to the reconstructed image, the encoding apparatus and the decoding apparatus may not perform clipping in deblocking filtering and the SAO process but perform clipping only on pixels via the ALF process. In this case, a final output value may be also limited to a value within a specific range.

Referring to FIG. 12, the encoding apparatus and the decoding apparatus may generate the reconstructed picture (S1210).

The reconstructed picture may be generated by generating a reconstructed block by each block unit. For example, the encoding apparatus and the decoding apparatus may generate the reconstructed block based a prediction block generated by prediction and a residual block reconstructed via dequantization and inverse transform. Alternatively, the encoding apparatus and the decoding apparatus may not perform prediction, transform and/or quantization on a block to which the I_PCM mode is applied. Here, the encoding apparatus may code pixel values in the I_PCM block as they are to transmit the pixel values to the decoding apparatus, and generate the reconstructed block directly from the pixel values in the I_PCM block. Further, the decoding apparatus may generate the reconstructed block directly from the pixel values transmitted from the encoding apparatus.

When the reconstructed picture is generated, the encoding apparatus and the decoding apparatus may determine whether to apply SAO (S1220).

For example, information about whether to apply SAO may be encoded in the encoding apparatus and be transmitted to the decoding apparatus. Here, the decoding apparatus may determine whether to apply SAO using the transmitted information. Further, as described above, the encoding apparatus and the decoding apparatus may not perform the SAO process on pixels in a block encoded in the I_PCM mode. Thus, the encoding apparatus and the decoding apparatus may determine not to perform the SAO process, for example, on the pixels in the block encoded in the I_PCM mode.

When SAO is not applied, the encoding apparatus and the decoding apparatus may perform deblocking filtering and then perform clipping on each deblocking-filtered pixel value (S1230). Here, the pixel value via clipping may be a final output value of the in-loop filtering process. When clipping is completed, the in-loop filtering process may terminate.

When SAO is applied, the encoding apparatus and the decoding apparatus may perform deblocking filtering and not perform clipping (S1240). When SAO is applied, the deblocking filtering process is not a final stage of the in-loop filtering process. Thus, clipping in the deblocking filtering process may be omitted to prevent loss of output accuracy and decrease in coding efficiency.

When SAO is applied, the encoding apparatus and the decoding apparatus may determine whether to apply the ALF after deblocking filtering is carried out (S1250).

For example, information about whether to apply the ALF may be included in a bit stream and transmitted from the encoding apparatus to the decoding apparatus. Here, the decoding apparatus may determine whether to apply the ALF using the transmitted information. Further, as described above, the encoding apparatus and the decoding apparatus may not perform the ALF process on pixels in a block encoded in the I_PCM mode. Thus, when the current CU is encoded in the I_PCM mode, the encoding apparatus and the decoding apparatus may determine not to apply the ALF to the pixels in the CU, which has been described in detail above and is not iteratively mentioned herein.

When the ALF is not applied, the encoding apparatus and the decoding apparatus may perform clipping on each SAO-applied pixel value after the SAO process (S1260). Here, each pixel value via clipping may be a final output value of the in-loop filtering process. When clipping is completed, the in-loop filtering process may terminate.

When the ALF is applied, the encoding apparatus and the decoding apparatus may perform the SAO process and not perform clipping (S1270). When the ALF is applied, the SAO process is not a final stage of the in-loop filtering process. Thus, clipping in the SAO process may be omitted to prevent loss of output accuracy and decrease in coding efficiency.

Here, after the SAO process is performed, the encoding apparatus and the decoding apparatus may perform the ALF process and perform clipping on each ALF-applied pixel value (S1280). Here, each pixel value via clipping may be a final output value of the in-loop filtering process. When clipping is completed, the in-loop filtering process may terminate.

While the methods in the above-mentioned exemplary embodiments have been described based on flowcharts including a series of steps or blocks, the present invention is not limited to the order of steps and some steps may be performed in a different stage or different order from described above or at the same time. Also, it should be noted that steps indicated in flowcharts are not restricted, but other steps may be included or one or more steps in flowcharts may be deleted without departing from the scope of the present invention.

Furthermore, the above-described embodiments include various forms of examples. Although all possible combinations have not been illustrated to describe various exemplary embodiments, it should be understood by a person having ordinary knowledge in the art that diverse combinations can be possible. Therefore, the present invention should be construed as including all other replacements, modifications, and changes which fall within the scope of the claims.

The invention claimed is:

1. A video decoding apparatus including circuitry configured to perform operations comprising:
  receiving video information through a bitstream;
  identifying whether an intra pulse code modulation (I_PCM) mode is applied to a current block in a current picture based on the video information;
  generating a reconstructed picture including a reconstructed block of the current block based on the video information;
  determining whether a deblocking filter is to be applied to the reconstructed block based on the result of the identification;
  determining whether a sample adaptive offset (SAO) is to be applied to the reconstructed block based on the result of the identification; and
  generating a modified reconstructed picture based on the reconstructed picture and the result of the determination,
  wherein, based on a case that the I_PCM mode is applied to the current block, the deblocking filter and the SAO are not applied to the reconstructed block, and
  wherein, based on a case that the I_PCM mode is not applied to the current block, the SAO is applied after the deblocking filter on the reconstructed picture, the modified reconstructed picture is generated by applying the deblocking filter and the SAO on the reconstructed picture, a first clipping is applied to a first output of the deblocking filter, a second clipping is applied to a second output of the SAO, and the clipped first output is used as an input of the SAO.

2. The video decoding apparatus of claim 1, wherein the deblocking filter is configured to determine a boundary strength (bS) of a block edge located within or on a boundary of the reconstructed block and determine whether to apply the deblocking filter to the block edge based on the bS, and
  wherein a pixel value which is not subjected to the deblocking filter within the reconstructed block is determined as the final pixel value based on a case that it is determined that the deblocking filter is not applied to the reconstructed block.

3. The video decoding apparatus of claim 1, wherein the deblocking filter is not applied to the block edge based on a case that it is determined that deblocking filter is not applied to the reconstructed block.

4. The video decoding apparatus of claim 1, wherein the SAO is applied by determining whether a band offset type is to be applied, deriving a band group including multiple bands among 32 band, and applying an offset corresponding a band in the band group to a value of a pixel in the reconstructed block, and
  wherein the value of the pixel in the reconstructed block is determined as final pixel value based on a case that it is determined that the SAO is not applied to the reconstructed block.

5. The video decoding apparatus of claim 1, wherein the video information comprises PCM flag information to instruct whether the current block is coded in the I_PCM mode.

6. The video decoding apparatus of claim 5, wherein the video information further comprises PCM loop filter flag information to instruct whether an in-loop filter is disabled to a block coded in the I_PCM mode, and
  wherein both the deblocking filter and the SAO are not applied to the reconstructed block based on a case that the PCM loop filter flag information has value 1 and the PCM flag information has value 1.

7. A video encoding apparatus including circuitry configured to perform operations comprising:

identifying whether an intra pulse code modulation (I_PCM) mode is applied to a current block in a current picture;

generating a reconstructed picture including a reconstructed block of the current block based on the result of the identification;

determining whether a deblocking filter is to be applied to the reconstructed block based on the result of the identification;

determining whether a sample adaptive offset (SAO) is to be applied to the reconstructed block based on the result of the identification;

generating a modified reconstructed picture based on the reconstructed picture and the result of the determination; and outputting video information including information related to whether the I_PCM mode is applied to the current block, wherein, based on a case that the I_PCM mode is applied to the current block, the deblocking filter and the SAO are not applied to the reconstructed block, and wherein, based on a case that the I_PCM mode is not applied to the current block, the SAO is applied after the deblocking filter on the reconstructed picture, the modified reconstructed picture is generated by applying the deblocking filter and the SAO on the reconstructed picture, a first clipping is applied to a first output of the deblocking filter, a second clipping is applied to a second output of the SAO, and the clipped first output is used as an input of the SAO.

8. A non-transitory decoder-readable storage medium storing encoded video information generated by:

identifying whether an intra pulse code modulation (I_PCM) mode is applied to a current block in a current picture;

generating a reconstructed picture including a reconstructed block of the current block based on the result of the identification;

determining whether a deblocking filter is to be applied to the reconstructed block based on the result of the identification;

determining whether a sample adaptive offset (SAO) is to be applied to the reconstructed block based on the result of the identification;

generating a modified reconstructed picture based on the reconstructed picture and the result of the determination; and outputting the video information including information related to whether the I_PCM mode is applied to the current block, wherein, based on a case that the I_PCM mode is applied to the current block, the deblocking filter and the SAO are not applied to the reconstructed block, and wherein, based on a case that the I_PCM mode is not applied to the current block, the SAO is applied after the deblocking filter on the reconstructed picture, the modified reconstructed picture is generated by applying the deblocking filter and the SAO on the reconstructed picture, a first clipping is applied to a first output of the deblocking filter, a second clipping is applied to a second output of the SAO, and the clipped first output is used as an input of the SAO.

* * * * *